United States Patent
Totale et al.

(10) Patent No.: US 10,460,015 B1
(45) Date of Patent: Oct. 29, 2019

(54) ASSIMILATION IN MULTI MODEL WEBPAGE COMPOSITION

(71) Applicant: Open Text Corporation, Waterloo (CA)

(72) Inventors: Sachin Gopaldas Totale, Bangalore (IN); Naveen K. Vidyananda, Bangalore (IN)

(73) Assignee: Open Text Corporation, Waterloo (CA)

( * ) Notice: Subject to any disclaimer, the term of this patent is extended or adjusted under 35 U.S.C. 154(b) by 132 days.

(21) Appl. No.: 14/671,212

(22) Filed: Mar. 27, 2015

(51) Int. Cl.
*G06F 17/00* (2019.01)
*G06F 17/22* (2006.01)
*G06F 16/958* (2019.01)

(52) U.S. Cl.
CPC ........ *G06F 17/2247* (2013.01); *G06F 16/958* (2019.01)

(58) Field of Classification Search
CPC .. G06F 15/18; G06F 17/2347; G06F 17/2247; G06F 16/958; G06Q 30/00
USPC ............................................. 715/234; 726/4
See application file for complete search history.

(56) References Cited

U.S. PATENT DOCUMENTS

| | | | | |
|---|---|---|---|---|
| 7,028,253 B1* | 4/2006 | Lieberman | ........ | G06F 17/30265 345/625 |
| 7,100,195 B1* | 8/2006 | Underwood | .......... | G06F 9/4443 707/999.009 |
| 7,437,614 B2* | 10/2008 | Haswell | .............. | G06F 11/3684 714/38.13 |
| 7,603,301 B1* | 10/2009 | Regan | .................... | G06Q 10/10 705/30 |
| 8,301,645 B1* | 10/2012 | Crook | ................. | G06F 16/2308 707/755 |
| 8,407,790 B2* | 3/2013 | Mony | ................... | G06F 21/566 726/22 |
| 8,543,907 B1* | 9/2013 | Roskind | ................ | G06F 16/958 715/234 |
| 8,615,800 B2* | 12/2013 | Baddour | ............. | H04L 63/1441 726/22 |
| 8,700,588 B2* | 4/2014 | Henkin | ................... | G06Q 30/02 707/705 |
| 9,081,865 B2* | 7/2015 | Reavis | .................... | G06Q 10/00 |
| 9,614,862 B2* | 4/2017 | Stern | .................... | H04L 63/1425 |
| 2002/0156688 A1* | 10/2002 | Horn | .................... | G06Q 10/087 705/14.51 |
| 2006/0036448 A1* | 2/2006 | Haynie | .................. | G06Q 10/10 705/37 |

(Continued)

OTHER PUBLICATIONS

EMC, "Getting Started with xCP 2.0", XCP2.0 Self-Paced Tutorial, Dec. 2012 (207 pages).

(Continued)

*Primary Examiner* — Cesar B Paula
*Assistant Examiner* — David Faber
(74) *Attorney, Agent, or Firm* — Sprinkle IP Law Group

(57) ABSTRACT

A method for assimilation in a page composition includes receiving an event trigger in a source webpage of a web application. A data collector bound to the event trigger collects data from data sources to obtain collected data. Via the data collector, a data model that includes the collected data is generated and populated into a session variable. A target page accessing the session variable may obtain data from the data model.

20 Claims, 6 Drawing Sheets

(56) References Cited

U.S. PATENT DOCUMENTS

| | | | | |
|---|---|---|---|---|
| 2006/0136309 A1* | 6/2006 | Horn | ................... | G06Q 10/087 |
| | | | | 705/26.8 |
| 2008/0189303 A1* | 8/2008 | Bush | ................ | G06F 17/30528 |
| 2010/0235402 A1* | 9/2010 | Han | ..................... | G06F 16/958 |
| | | | | 707/802 |
| 2011/0173680 A1* | 7/2011 | Bates | ..................... | G06Q 10/10 |
| | | | | 726/4 |
| 2013/0060915 A1* | 3/2013 | Crook | ................ | G06F 16/2308 |
| | | | | 709/219 |
| 2014/0304301 A1* | 10/2014 | Reavis | .................. | G06Q 10/00 |
| | | | | 707/771 |
| 2015/0033331 A1* | 1/2015 | Stern | .................. | H04L 63/1425 |
| | | | | 726/22 |
| 2016/0077672 A1* | 3/2016 | Anderson | ............ | G06F 16/957 |
| | | | | 715/234 |
| 2016/0253379 A1* | 9/2016 | Ford | ................ | G06F 17/30442 |
| | | | | 707/721 |
| 2017/0139802 A1* | 5/2017 | Hajiyev | .............. | G06F 11/3476 |

OTHER PUBLICATIONS

"EMC Documentum xCP Designer Help Version 2.0 User Guide", EMC Corporation, 2012 (325 pages).
"EMC Documentum xCelerated Composition Platform Designer Help Version 2.1 User Guide", EMC Corporation, Corporate Headquarters, Hapkinton, MA, 2014 (373 pages).
"EMC Documentum xCelerated Composition Platform: Version 2.1 Developer Guide", EMC Corporation, Corporate Headquarters, Hopkinton, MA, 2014 (82 pages).

\* cited by examiner

ASSIMILATION IN MULTI MODEL WEBPAGE COMPOSITION

BACKGROUND

A web application is a software application that executes in a web browser. The web application may include one or more features, such as graphical user interface widgets, processes, and other aspects of the web application. In developing a web application, a developer may desire to have a webpage prepopulated with data, that may then be updated by an end user.

DETAILED DESCRIPTION

Figure 1:
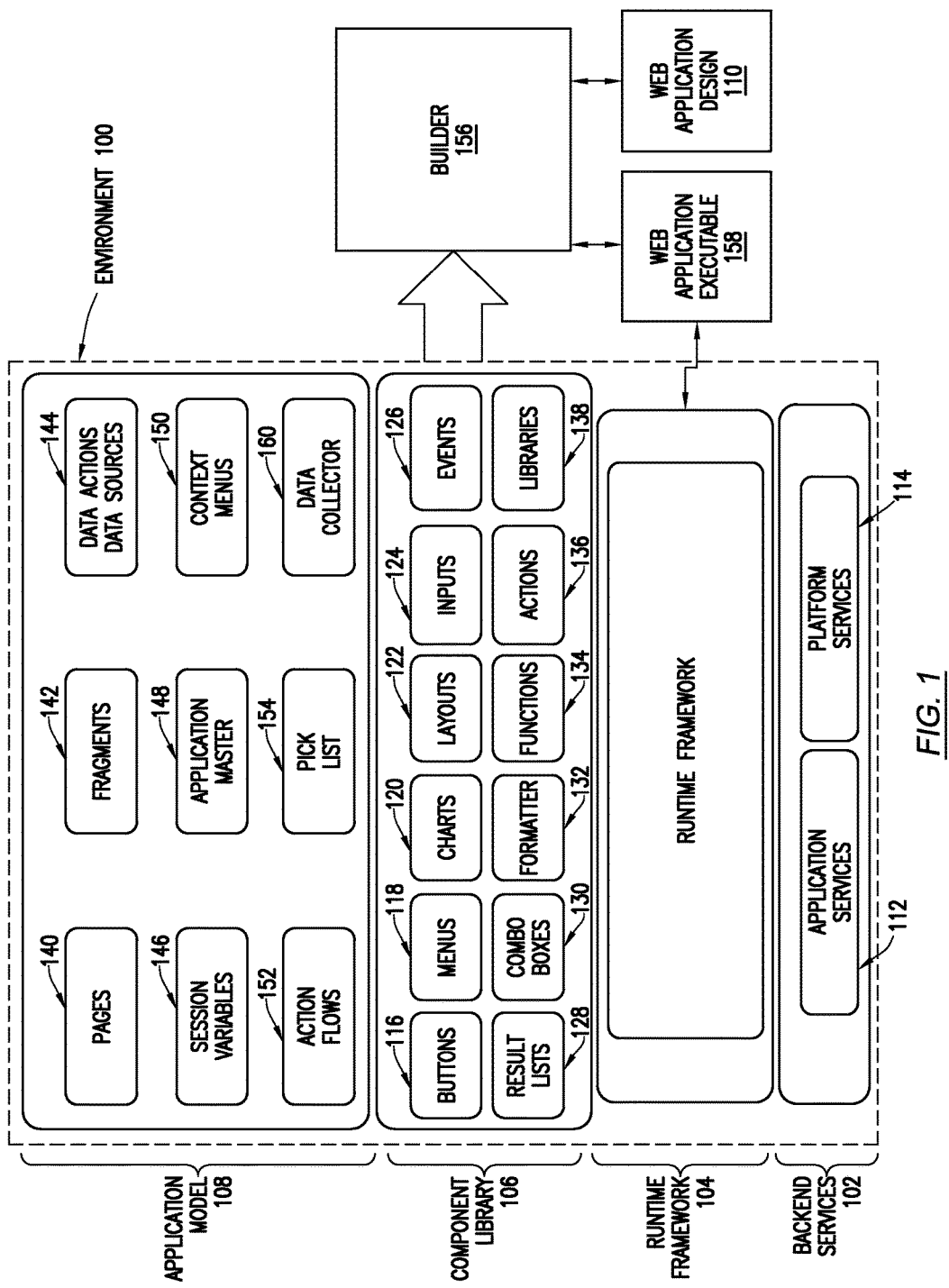
FIGS. 1 and 2 show schematic diagrams of systems in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to transferring data from data sources to a target webpage using a data collector. In particular, the data collector is configured to collect data from a variety of data sources and generate a data model for the collected data. The data model is populated into a session variable, which may be accessed by a target webpage. In some embodiments, multiple data actions that may be used to trigger an event of data collection are bound to the same data collector. In other words, the multiple data actions may only reference the data collector to gather data from multiple data sources, and the data collector handles overhead of collecting data and making the data available to one or more targets.

FIG. 1 shows a schematic diagram of a system in accordance with one or more embodiments of the technology. Specifically, FIG. 1 shows a schematic diagram of an environment (100) for developing and executing a web application that implements the context menu fragment management. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The component library (106) may include user interface (UI) components and processing components.

In one or more embodiments of the technology, UI widgets are components that are displayed to an end user. In other words, instances of the UI widgets are displayed on a display device. In one or more embodiments of the technology, the UI widgets may include, but are not limited to, buttons (116) (e.g., radio buttons, common buttons), menus (118) (e.g., drop down menu, check boxes), charts (120), layouts (122), inputs (e.g., fields) (124) and combo boxes (130). UI widgets in the component library may each be associated with a set of options. The set of options define the execution of the UI widget. Namely, the set of options define how a particular instance of the component is executed. Options associated with the UI widgets may include formatting, any text that is displayed, any action that is to be performed when the UI widget is selected, other options, and/or any combination thereof. In one or more embodiments of the technology, UI widgets may be bound to one or more business object types. In other words, the UI widgets may display data in or derived from one or more instances of a business object type.

In one or more embodiments of the technology, a business object type is a representation of a type of real-world object used by a business. For example, a business object type may be a customer, an employee, a product, a company, or other object type. A business object type may include multiple attributes. The attributes are the properties of the real-world object, such as name, address, price, and other attributes. An instance of a business object type is a particular business object having attribute values. For example, if a business object type is employee, an instance of an employee business object type is a representation of a particular employee.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components are discussed below.

Formatter (132) are instructions which enable arranging of the data in specific formats in accordance with one or more embodiments of the technology. A formatter may be application to number, date time values, other values, or a combination thereof. In accordance with one or more embodiments of the technology, functions (134) are the re-usable piece of code, which takes a set of inputs and return an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files which constitute utility, and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), a pick list (154), and a data collector (160). Each of these components of the application model is described below.

A page (140) in the application model (108) is a template for a web page. In other words, a page in the application model (108) is a template for a complete and individual document that is displayable to the end user. In one or more embodiments of the technology, a page in the development environment is a generic template in that the page is generic to any business object type. The generic template may include instructions for defining a webpage of a particular type, such as, for example, a create webpage, an update webpage, a validate webpage, and a delete webpage. Such instructions may, for example, include an instruction to iterate through each attribute type of the business object type and generate a field or other UI widget for the attribute type and a label in a webpage.

An activity fragment (142) represents at least a portion of an activity. In other words, an activity is a defined sequence of actions that an end user may perform using the web application. An activity fragment is a portion of the defined sequence of actions. Data actions and data sources (144) define the storage structure and storage location of the data and the actions to perform on the data.

Session variables (146) are the variables stored for a particular session between the end user and the web application executable (158). A session variable may be referred to as a session parameter. For example, session variables (146) may include connection variables and information about the end user, such as the user's credentials (e.g., user identifier), role of the end user, and other information.

In one or more embodiments of the technology, a session variable includes functionality to store a data model (not shown). A data model is a storage structure for data collected by the data collector. In one or more embodiments of the technology, the data model includes data item identifier and data item value pairs of data. In other words, each data item in the data model may include an data item identifier and a corresponding data item value of the data item. The data item identifier is any alphanumeric and/or symbolic identifier of a data item, and may be used to refer to the data item. In some embodiments, rather than having an explicit data item identifier, the data item identifier may be based on the position of the data item in the data model. In one or more embodiments of the technology, the data item value is a value gathered from a data source (discussed below and in FIG. 2).

In one or more embodiments of the technology, the data model may be hierarchical. In other words, the data model may store one or more sub data models. Similarly, sub data models may store sub data models. Each sub data model in the hierarchy may itself be a data model.

Continuing with FIG. 1, the application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. In other words, context menus are selected in a same or similar manner, but have options that are dependent on the context in which the context menu is displayed.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items may be selected. In other words, more than one displayed item may be selected from a pick list.

A data collector (160) is a component that includes functionality to collect data from multiple data sources. In the application model, the data collector (160) is a template for specifying data items to collect. In particular, the template for a data collector (160) may include a field for specifying a data item identifier, and a field for specifying a data item location of each data item.

The web application design (110) is a particular design of a web application created by a developer. Specifically, the web application design (110) includes instances of the components of the application model (108) and component library (106), may execute on the runtime framework (104) and use the backend services (102).

The web application design (110) is connected to a builder (156) in accordance with one or more embodiments of the technology. The builder (156) provides a UI for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The UI of the builder (156) may include editor features and sub-systems. The editor features may include editors for modifying various aspects or views of the web application design, and/or a builder UI to assist in the development of the web application design in accordance with one or more embodiments of the technology. For example, the editors may include business object types, documents, cases, searches, reports, pages, roles, apps, widgets, and process editors. The builder UI may include a new artifact wizard, add-on top-level menu, add-on tool bar buttons, context menus, an artifacts properties page, and a model editor.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, and package and deploy the web application. The builder (156) may also include components functionality to perform source control and project/library management.

Figure 2:
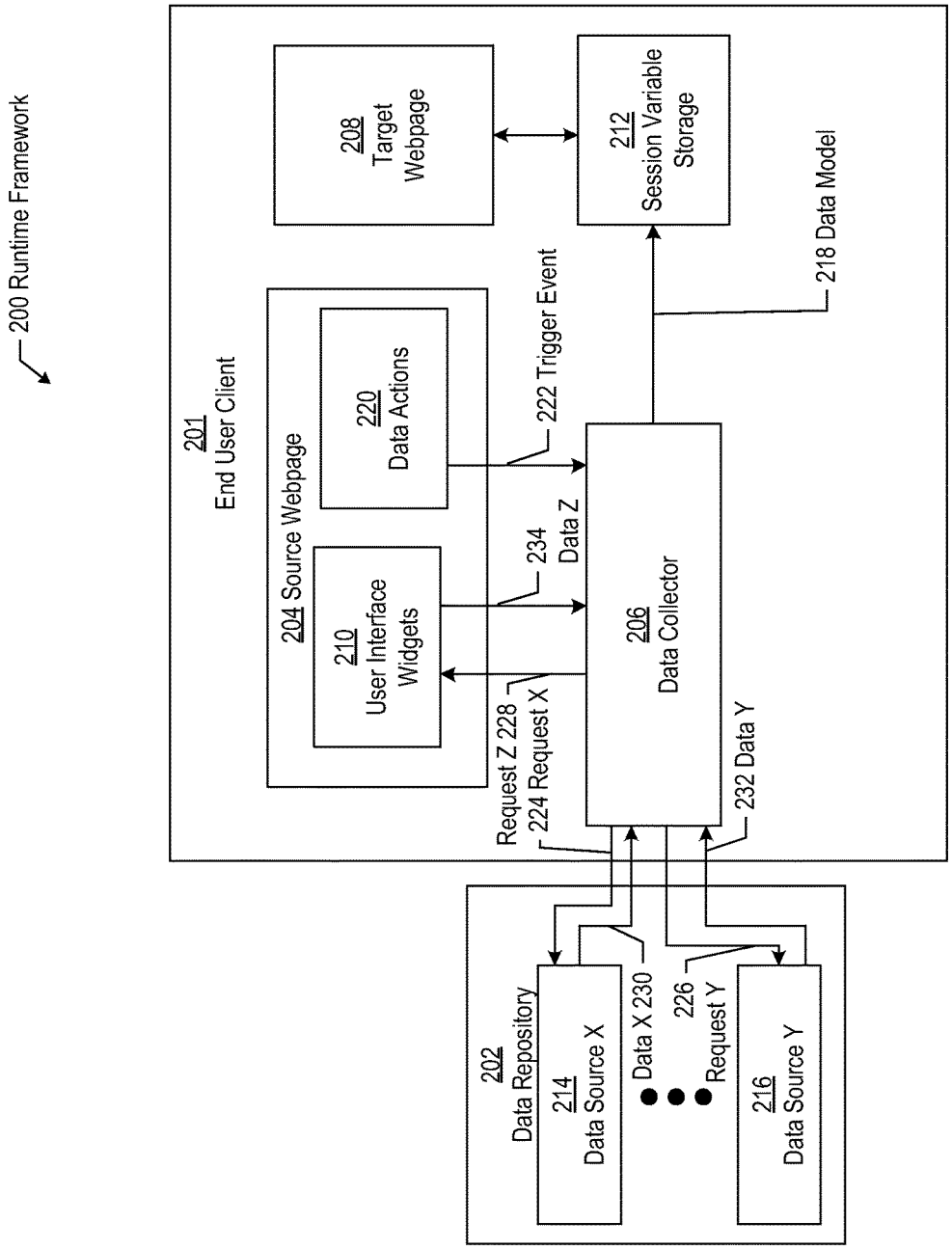

FIG. 2 shows a schematic diagram of a runtime framework (200) in accordance with one or more embodiments of the technology. In particular, FIG. 2 shows a schematic of the runtime framework when the web application is deployed and executing in accordance with one or more embodiments of the technology. As shown in FIG. 2, the runtime framework includes a data repository (202) and an end user client (201). Both of these components are described below.

In one or more embodiments of the technology, the data repository (202) is any type of storage unit and/or device (e.g., a file system, database, collection of tables, or any other storage mechanism) for storing data. Further, the data repository (202) may include multiple different storage units and/or devices. The multiple different storage units and/or devices may or may not be of the same type or located at the same physical site. The data repository (202) includes functionality to store data sources (e.g., data source X (214), data source Y (216)).

Data sources (e.g., data source X (214), data source Y (216)) are sources of data. Specifically, the data sources include functionality to store data. The data sources may be heterogeneous. The heterogeneity may be based on the device storing the data, the location, the storage structure, or any other basis in which data sources may vary. For example, one data source may be a database while another data source is a website. By way of another example, one data source may be structured, while another data sources is unstructured. Further, one or more of the data sources may be operated by a third party while another data source is local.

In one or more embodiments of the technology, the end user client (201) is the client side portion of the web application that executes in a web browser. Although FIG. 1 shows the data repository (202) as remote from the end user client (201), all or a portion of the data repository (202) may be local on the client device of the end user client (201). The end user client may include a session variable storage (212) in accordance with one or more embodiments of the technology. In one or more embodiments of the technology, the end user client (201) includes functionality to execute webpages (e.g., source webpage (204), target webpage (208)) and a data collector (206).

In one or more embodiments of the technology, session variable storage (212) includes functionality to store session variables. In one or more embodiments of the technology, each session variable may have a session variable identifier and a session variable value. The session variable identifier is an alphanumeric and/or symbolic unique identifier of a session variable. The session variable value is the value of the session variable. The session variable value may be an object, such as a data model, having multiple values. In particular, at least one of the session variables in the session variable storage is a data model (218). More than one data model (218) may be in the session variable storage.

Continuing with the end user client (201), in one or more embodiments of the technology, the webpage (e.g., source webpage (204), target webpage (208)) is a particular instance of a webpage generated in the development environment. The webpage is displayed on an end user's device. In other words, the webpage is an instance of a page, discussed above, that is rendered by a web browser and displayed to a user. In one or more embodiments of the technology, the source webpage (204) is a webpage that triggers a data collector (206). The source webpage (204) may include UI widgets (210) and data actions (220). The UI widgets (210) may be instances of the same or similar UI widgets (210) discussed above with reference to FIG. 1. In some embodiments, UI widgets (210) include functionality to receive data from a user. For example, UI widgets may correspond to fields, textboxes, radio buttons, checkboxes, or other elements of a user interface that may receive from an end user. Although not expressly shown in FIG. 2, one or more UI widgets (210) may be data sources that are on the source webpage (204).

In one or more embodiments of the technology, data actions (220) correspond to commands to perform an action on data. For example, data actions (220) may correspond to selectable buttons for the end user to issue a command. In the example, the data actions may correspond to update, new, delete, or other actions. In one or more embodiments of the technology, the various corresponding actions may use data from multiple data sources (e.g., user interface widgets (210), data source X (214), data source Y (216)). The data used by multiple actions may be partially or completely overlapping. Data actions (220) include functionality to trigger the data collector (206). In particular, the selection of a data action (220) may correspond to a trigger event (222) that triggers the data collector (206) to perform a collection.

Continuing with the webpages, the target webpage (208) is connected to session variable storage (212). The target webpage (208) is a webpage that consumes a data model (218). In other words, the target webpage (208) may include instructions for gathering data from the data model (218).

The data collector (206) is software code distributed with a web application to the end user client (201) that includes functionality to collect data. In particular, the data collector (206) is communicatively connected to data sources (e.g., user interface widgets (210), data source X (214), data source Y (216)) and includes functionality to issue a request (e.g., request X (224), request Y (226), request Z (228)) and receive data (e.g., data X (230), data Y (232), data Z (234)). In one or more embodiments of the technology, the data collector (206) further includes functionality to format the data into a data model (218).

In one or more embodiments of the technology, an expression infrastructure is interposed between the source webpage (204) and the data repository (202). In particular, the expression infrastructure is operatively connected, directly or indirectly, to the data repository (202) and the webpage (204). In one or more embodiments of the technology, the expression infrastructure includes functionality to obtain an instruction that includes an expression for prepopulating a UI widget, obtaining data from one or more data sources for executing the expression, and executing the expression based on the data from the one or more data sources to obtain a result.

In one or more embodiments of the technology, an event bus may be interposed between the expression infrastructure and the webpage (204). In one or more embodiments of the technology, an event bus includes functionality to receive an event and to call a corresponding component (e.g., data collector, expression infrastructure) to perform the action(s) requested by the event. For example, the event may be a command to perform data collection, display a webpage (204), update a data source (e.g., X data source (214), Y data source (216)), display a menu, or another event.

While FIGS. 1 and 2 show a configuration of components, other configurations may be used without departing from the scope of the technology. For example, various components may be combined to create a single component. As another example, the functionality performed by a single component may be performed by two or more components.

Figure 3:
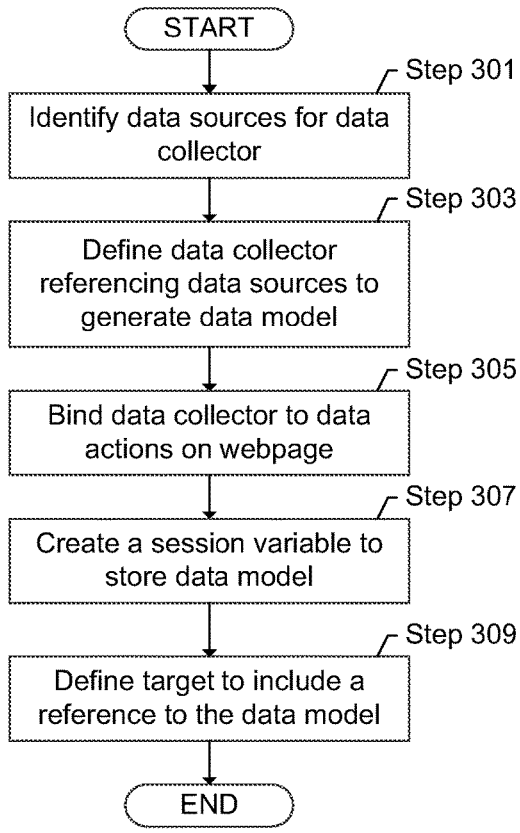
FIGS. 3 and 4 show flowcharts in accordance with one or more embodiments of the technology.
Figure 4:
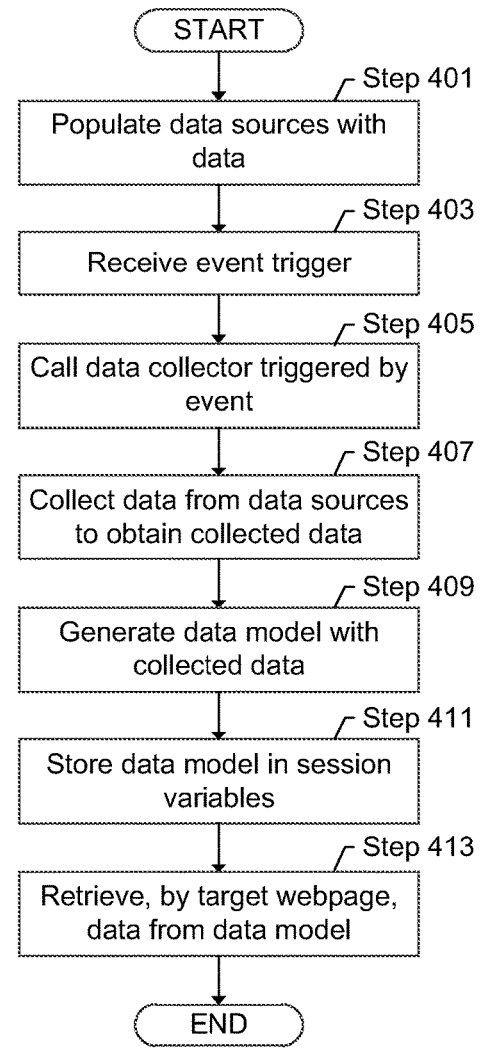

FIGS. 3 and 4 show flowcharts in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 3 shows a flowchart for creating a web application design. FIG. 3 may be performed by and/or using the components of FIG. 1. In Step 301, data sources for a data collector are identified in accordance with one or more embodiments of the technology. In one or more embodiments of the technology, the development environment shown in FIG. 1 facilitates a drag and drop and an expression based development of a web application. Thus, using the developer tools offered by the development environment, a developer may drag and drop components into a web application design to define various components of the web application design. Some of the components may have predefined templates and logic. In such a scenario, once dragged into the web application design, the developer may submit values of various parameters of the components. For example, the developer may submit a unique identifier, any references, or any other information. For a webpage, the developer may create UI widgets on the webpage. The developer may also define various data actions for the webpage.

In Step 303, a data collector referencing data sources is defined to generate a data model in accordance with one or more embodiments of the technology. Defining the data collector may include dragging an icon representing the data collector template in the development environment into the web application design. In some embodiments, the data collector is defined for the source webpage. In such a scenario, an icon representing the data collector template is dragged into the portion of the design for the source webpage. In other embodiments, the data collector is defined for the web application. In such a scenario, the icon representing the data collector template is dragged to a centralized location for the web application design.

Further, the parameters for the data collector template are entered to define the data collector. In particular, for each data action, the data sources of the corresponding action are identified. The data collector is defined to include, for each data source, a data item identifier and a reference to the data source. In some embodiments, not all data sources referenced by the data collector are used by each action. However, by defining a single data collector, one or more embodiments provide a centralized location to make any changes to references of data sources. In other words, if four data actions use the same data item from a data source, if the data source changes, only one reference in the data collector is updated in accordance with one or more embodiments of the technology.

In Step 305, the data collector is bound to data actions on the webpage in accordance with one or more embodiments of the technology. In other words, each data action on the page has a corresponding parameter defining actions to perform when the data action is selected. In accordance with one or more embodiments of the technology, the parameter is set to include a trigger event to the data collector. For example, the identifier of the data collector may be set as a parameter. The parameter may also include additional steps, such as trigger a webpage, perform an update to a server, or another action.

In Step 307, a session variable is created to store the data collector. In one or more embodiments of the technology, the developer may access the session variable definition and create a new session variable that links to the data collector. In particular, the link may be through an identifier of the data collector being added as a session variable parameter. Hidden from the developer, the builder may generate the web application that issues the corresponding calls.

In Step 309, the target is defined to include a reference to the data model in accordance with one or more embodiments of the technology. In one or more embodiments of the technology, if the target is a webpage, the target webpage includes a reference to the data model by the data model identifier in the session variable storage. Further, portion of the target webpage may reference each data item by the data item's corresponding identifier. In one or more embodiments of the technology, the developer may define the target to include the reference using the corresponding identifiers of the data model and the data item in the data model. In some embodiments, the target may be remote storage, such as a data base. In such embodiments, the remote storage may be configured to retrieve the data model from the session variables and extract data items from the data model. Further, the web application may be configured to transmit the data model to the remote storage.

Thus, receiving the web application definition may include receiving the developer's input through the graphical user interface of the developer environment and generating the internal version of the web application design while the web application design is being developed. In one or more embodiments of the technology, for each expression, an instruction may be generated, such as by a code generator, to implement the expression. For example, the expression may be encapsulated in an instruction for the UI widget. Thus, the developer does not need to specify the instructions of the webpage. Rather, the developer may simply drag and drop UI widgets, provide properties for the UI widgets, and have the builder generate the code for each webpage and the web application.

Once the code is generated, the web application may be executed. FIG. 4 shows a flowchart of executing a web application in accordance with one or more embodiments of the technology. In one or more embodiments of the technology, the operations in FIG. 4 are performed by the end user client, such as a web browser and using the components of FIG. 2. In Step 401, data sources are populated with data in accordance with one or more embodiments of the technology. In particular, as one or more end users are using the web application, the end user may provide data to the web application. For data not on the source webpage, the web application may store the data in remote data storage, and in data models. Alternatively or additionally, data sources may be populated using other techniques. For a source webpage, the end user may enter the data in various UI widgets. For example, the end user may select options from drop down boxes, radio buttons, and/or checkboxes, type data into fields and text boxes, perform other actions, or a combination thereof.

In Step 403, an event trigger is received in accordance with one or more embodiments of the technology. In one or more embodiments of the technology, the end user may select a data action on the source webpage, and, thereby, cause the event trigger. In other embodiments, the data action is automatic code that executes without a selection. In such a scenario, when the conditions for the data action occur, the data action may automatically cause an event trigger.

In Step 405, data collector that is triggered by the event trigger is called. In particular, the event trigger may trigger the event bus, which initiates the data collector to collect data.

In Step 407, data is collected from data sources to obtain collected data in accordance with one or more embodiments of the technology. In particular, for each data item in the data model definition, the corresponding referenced location for the data item is obtained. From the referenced location, a data item value is extracted.

In Step 409, a data model is generated with the collected data in accordance with one or more embodiments of the technology. The extracted data value from Step 407 may be stored in the data model with the corresponding data item identifier.

In Step 411, the data model is stored in the session variables in accordance with one or more embodiments of the technology. In one or more embodiments, the data model is added to the session variables on the local end user client device. Thus, the web application on the end user device may not need to access the remote storage in order to process data.

In Step 413, the target webpage retrieves data from the data model in accordance with one or more embodiments of the technology. For each data item used by the target page, the target page may access the session variable having the data model. From the data model, using the data item identifier, the target webpage may extract the corresponding data item value. Thus, the target webpage may consume the data item value in accordance with one or more embodiments of the technology.

In one or more embodiments, the data collector provides a centralized and consistently defined storage for data collected during the processing of a web application that is local on a client. Thus, for example, if a change to the referencing of the data or the location of the data exists, the only change may be to the data collector.

Figure 5:
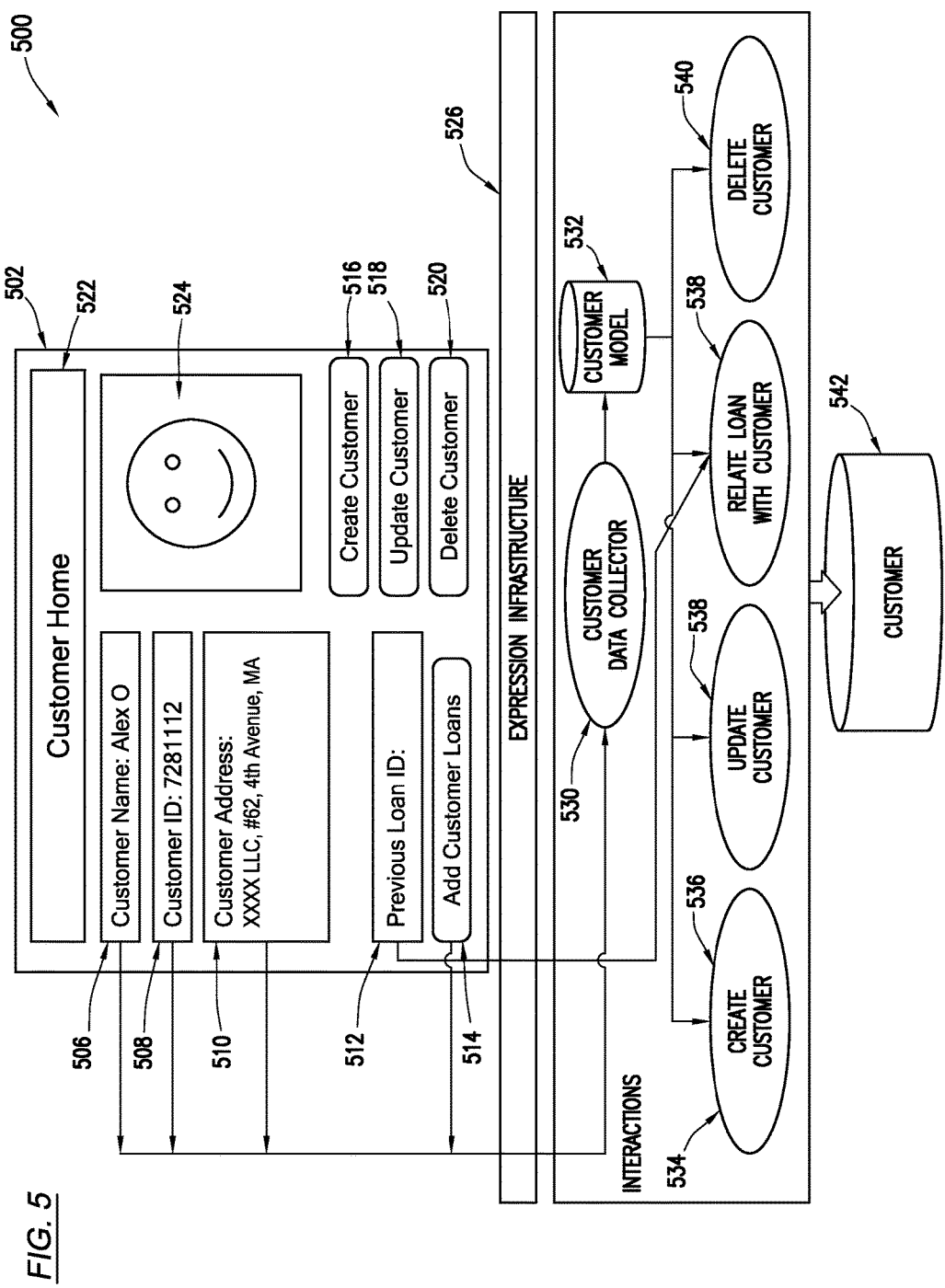
FIGS. 5 and 6 show examples in accordance with one or more embodiments of the technology.
Figure 6:
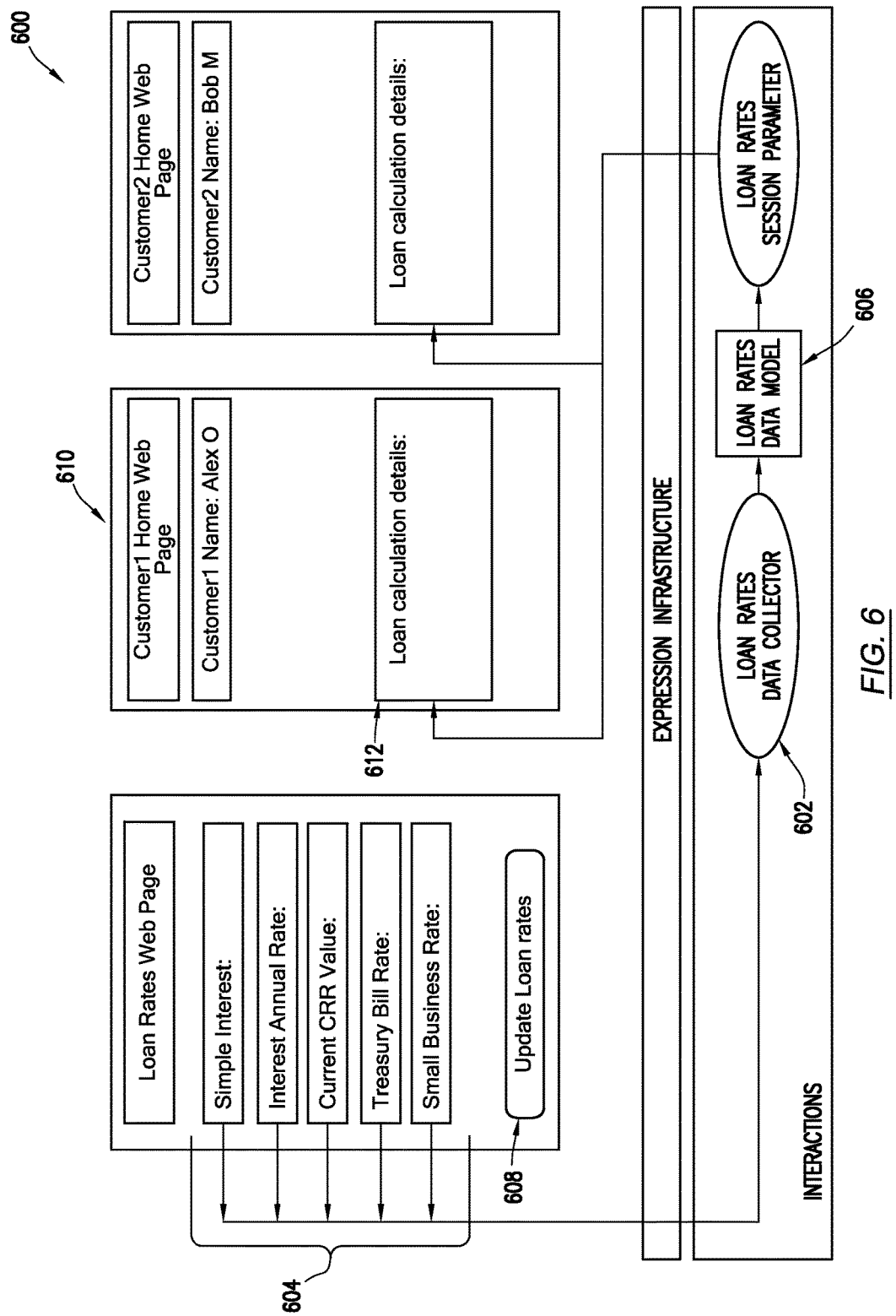

FIGS. 5 and 6 show examples in accordance with one or more embodiments of the technology. The following examples are for explanatory purposes only and not intended to limit the scope of the technology. FIG. 5 shows an example runtime framework (500), such as the runtime framework in FIG. 2, for collecting data from a source webpage (502). As shown in FIG. 5, the source webpage (502) may have multiple UI widgets for receiving data, such as a customer name field (506), a customer identifier field (508), a customer address field (510), and a previous loan identifier field (512). The source webpage may also have other fields, such as a title of "Customer Home" (522) and image (524).

The source webpage may also have multiple data actions, such as add customer loans (514), create customer (516), update customer (518), and delete customer (520) in accordance with one or more embodiments of the technology. The above data actions may take various items of data from the UI widgets. For example, the create customer data action (516) may take as inputs the customer name, the customer identifier, and the customer address and output whether the creation is successful.

When any of the data actions are triggered, the expression infrastructure (526) may call the customer data collector (530), that generates a customer model (532). The following is an example of a customer model.

```
Data Model Identifier: Customer
Data Items:
    customer_name        String(30),
    customer_id          String(10),
    customer_address     String(100),
    primary_bank_acc     String(30),
    previous_ln_id       String (10)
    ssn_no               String(20)
```

In the above data model, the customer name, customer identifier, and customer address may be obtained from the source webpage. The customer's primary bank account number and social security number may be collected from an external source, such as a server side data repository. Because the data from the various UI widgets may be used by multiple data actions, without the data collector, multiple bindings may be performed for each data item. Further, validation may be performed multiple times without the data collector. However, by having the data collector generate a centralized customer model, each data action is bound to the data collector. The corresponding instructions (e.g., create customer (534), update customer (536), relate loan with customer (538), delete customer (540)) for each action, may operate on the customer model rather than each individual widgets. As shown in FIG. 5, the target for the data actions may be a customer data repository (542) in accordance with one or more embodiments of the technology.

FIG. 6 shows another example (600) in accordance with one or more embodiments of the technology. The example may correspond to an example of the system and methods discussed above with reference to FIG. 1-4. In the example in FIG. 6, a data collector (602) assimilates data from multiple UI widgets like text boxes (604) and creates a loan rates data model (606). The loan rates data model (606) is stored into a session variable (608). The loan rates data model may then be used across multiple pages of the web application. Below is an example of a loan rates data collector, a corresponding session variable, and a corresponding data binding.

```
Data Collector: LoanRates Data Collector
    Inputs:
        simple_interest = widgets.simple_interest.value
        interest_annual_rate = widgets.annual_rate.value
        crr_value = widgets.crr_field.value
    Outputs:
        LoanRates model object
    Session Variable Name: loan_rates
        attributes:
            loan_rate LoanRates(Model)
    Example of data binding:
        loan_rate = LoanRates(DataCollector).model
```

As shown in the example, the loan rates data collector may take the simple interest, interest annual rate, and the crr value as the data items collected. The result of the collection, or output, is a loan rates model object. The session variable stores the loan rates model as an attribute. The example of the data binding shows, for example, the instruction in the updates loan rates data action (608). In particular, the data binding is a call to the loan rates data collector (602).

In a target webpage (610), the session variable may be bound to an input. For example, as shown in FIG. 6, the session variable is bound to the loan calculation detail field (612) to calculate a loan. Below is an example of the binding to the loan calculation field.

```
Data Source: loan_calculation
    Inputs:
        loan_rate              LoanRates(Model)
    Output:
        applicable_rate        float,
        loan_term              float,
        loan_conditions        String
```

In the above example, the session variable binding takes, as input, the name of the model in the session parameters, and returns, as output, the applicable rate, the loan term, and loan conditions. The loan calculation details field (612) may then use the output to provide information about the loan calculation. Further, as shown by multiple instances of the webpage, each end user may have a webpage that is customized for the customer and includes the data in the end user's session variables.

Figure 7:
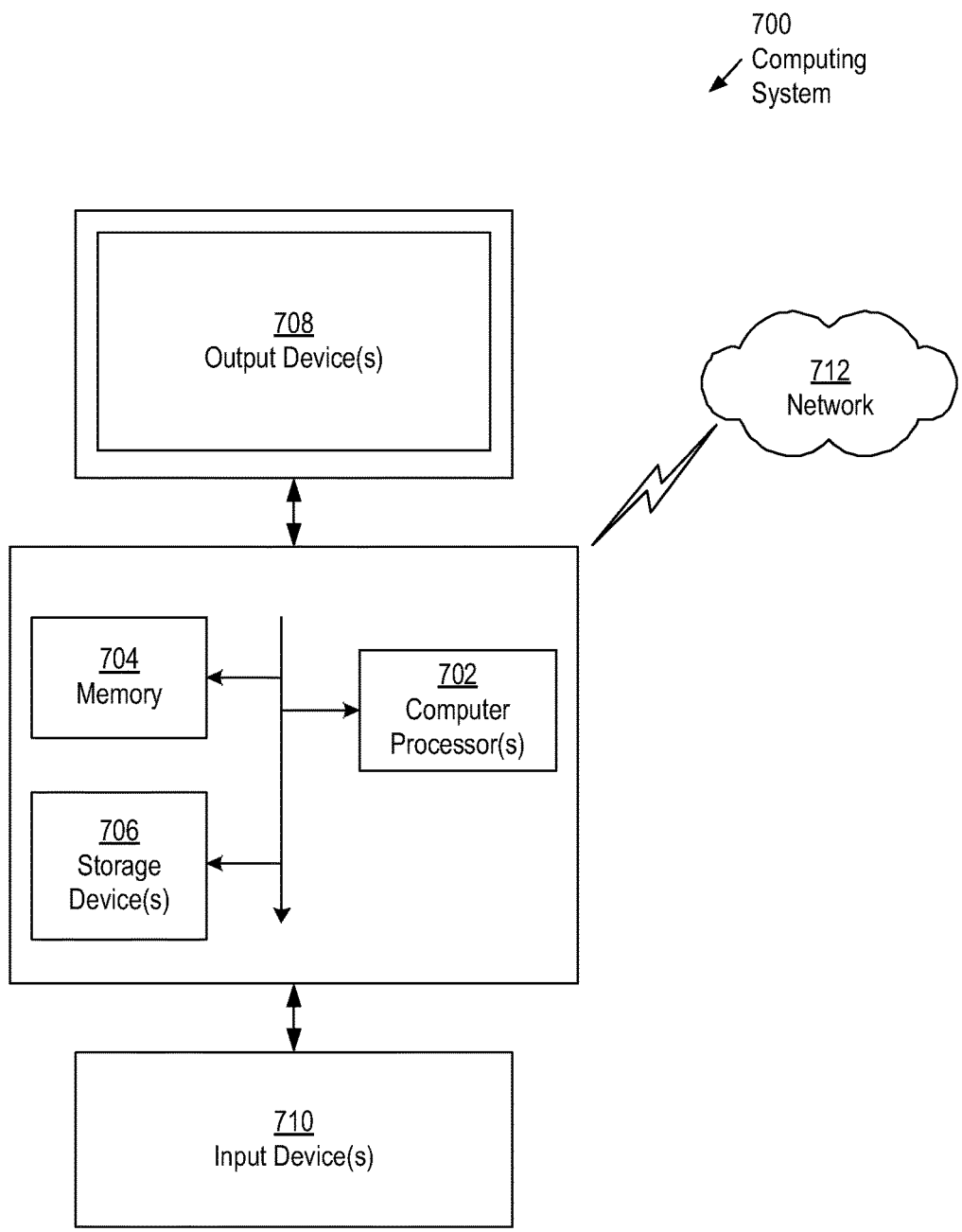
FIG. 7 shows a computing system in accordance with one or more embodiments of the technology.

Embodiments of the technology, such as shown in FIGS. 1-4, may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for assimilation in a page composition comprising:
   at a client device:
   receiving a source webpage of a web application;
   rendering the source webpage in a browser on the client device;
   receiving an event trigger in the source webpage of the web application rendered in the browser on the client device; and
   in response to receiving the event trigger in the source webpage of the web application rendered in the browser on the client device:
   collecting, by a data collector at the client device bound to the event trigger, data from a plurality of data sources to obtain collected data at the client device, the plurality of data sources including at least one webpage and at least one database;
   generating at the client device, via the data collector, a data model comprising the collected data;
   populating a session variable in session variable storage at the client device with the data model such that the value of the session variable comprises the data model, the data model having multiple values, wherein the session variable links to the data collector via a session variable parameter value that identifies the data collector; and obtaining, by a target webpage on the client device accessing the session variable at the client device, the data from the data model.

2. The method of claim 1, wherein at least a portion of the plurality of data sources comprise a graphical user interface widget on the source webpage.

3. The method of claim 1, wherein the data collector is referenced by a plurality of event triggers on the source webpage to trigger collecting the data, and wherein the event trigger is in the plurality of event triggers.

4. The method of claim 1, wherein the data model conceals the data.

5. The method of claim 1, wherein collecting the data comprises:
for each data source of the plurality of data sources referenced by the data collector:
gathering a data value from the data source, and
populating a data attribute in the data model with the data value.

6. The method of claim 1, wherein collecting the data comprises: obtaining a sub-model for each of the plurality of data sources, and wherein generating the data model comprises incorporating the sub-model into the data model to obtain a hierarchical model.

7. The method of claim 1, wherein the at least one webpage comprises the source webpage.

8. A system for assimilation in a webpage composition comprising:
a computer processor;
memory storing a web application, which when executed on the computer processor, causes the computer processor to:
receiving a source webpage of a web application at a client device;
rendering the source webpage in a browser on the client device;
receive an event trigger in the source webpage of the web application rendered in the browser on the client device; and
in response to receiving the event trigger in the source webpage of the web application rendered in the browser on the client device:
collect, by a data collector at the client device bound to the event trigger, data from a plurality of data sources to obtain collected data at the client device, the plurality of data sources including at least one webpage and at least one database;
generate, at the client device by the data collector, a data model comprising the collected data;
populate a session variable in session variable storage at the client device with the data model such that the value of the session variable comprises the data model, the data model having multiple values, wherein the session variable links to the data collector via a session variable parameter value that identifies the data collector; and
obtain, by a target webpage on the client device accessing the session variable at the client device, the data from the data model.

9. The system of claim 8, wherein at least a portion of the plurality of data sources comprise a graphical user interface widget on the source webpage.

10. The system of claim 8, wherein the data collector is referenced by a plurality of event triggers on the webpage to trigger collecting the data, and wherein the event trigger is in the plurality of event triggers.

11. The system of claim 8, wherein the data model conceals the data.

12. The system of claim 8, wherein collecting the data comprises:
for each data source of the plurality of data sources referenced by the data collector:
gathering a data value from the data source, and
populating a data attribute in the data model with the data value.

13. The system of claim 8, wherein collecting the data comprises: obtaining a sub-model for each of the plurality of data sources, and wherein generating the data model comprises incorporating the sub-model into the data model to obtain a hierarchical model.

14. The system of claim 8, wherein the at least one webpage comprises the source webpage.

15. A non-transitory computer readable medium for data assimilation comprising computer readable program code for:
generating, in a web application design, a data collector referencing a plurality of data sources on a source webpage to be rendered in a browser on a client device, the data collector configured to generate a data model from data in the plurality of data sources and at least one database;
binding, in the web application design, the data collector to a plurality of data actions on the source webpage to be rendered in a browser on a client device;
creating, in the web application design, a session variable that stores the data model in session variable storage at the client device, the session variable having a session variable value comprising the data model, the data model having multiple values, wherein the session variable links to the data collector at the client device via a session variable parameter value that identifies the data collector; and
generating a web application from the web application design.

16. The non-transitory computer readable medium of claim 15, wherein the plurality of data sources comprises a plurality of user interface widgets on the source webpage.

17. The non-transitory computer readable medium of claim 15, wherein the plurality of data actions comprises a plurality of selectable buttons on the webpage.

18. The non-transitory computer readable medium of claim 15, further comprising computer readable program code for:
generating a target webpage comprising a reference to the data model in the session variable.

19. The non-transitory computer readable medium of claim 15, further comprising computer readable program code for:
generating a plurality of widgets for the source webpage, wherein the data collector is automatically generated in response to generating the plurality of widgets, wherein the plurality of data sources comprises the plurality of widgets.

20. The non-transitory computer readable medium of claim 15, further comprising computer readable program code for:
deploying the web application to execute in a browser of an end user client computer system.

* * * * *